US008200651B2

(12) United States Patent
Bonanni et al.

(10) Patent No.: US 8,200,651 B2
(45) Date of Patent: Jun. 12, 2012

(54) COMPREHENSION OF DIGITALLY ENCODED TEXTS

(75) Inventors: Cristina Bonanni, Rome (IT); Paola Carlesimo, Rome (IT); Alessandra Rotunno, Rome (IT)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 12/357,847

(22) Filed: Jan. 22, 2009

(65) Prior Publication Data

US 2009/0187547 A1     Jul. 23, 2009

(30) Foreign Application Priority Data

Jan. 23, 2008    (EP) ..................................... 08150561

(51) Int. Cl.
*G06F 17/30*     (2006.01)
(52) U.S. Cl. ........................................................ 707/707
(58) Field of Classification Search ........................ None
See application file for complete search history.

(56) References Cited

U.S. PATENT DOCUMENTS

| 6,338,059 | B1 * | 1/2002 | Fields et al. .................. 715/208 |
| 7,162,473 | B2 | 1/2007 | Dumais et al. | |
| 2003/0055827 | A1 | 3/2003 | Keohane et al. | |
| 2011/0219291 | A1 * | 9/2011 | Lisa .............................. 715/207 |

* cited by examiner

*Primary Examiner* — Baoquoc To
(74) *Attorney, Agent, or Firm* — D'Ambrosio & Menon, PLLC; Usha Menon; Srikant Viswanadhan (57) ABSTRACT

Methods, computer program products and systems for facilitating computer-assisted user comprehension of digitally encoded texts. In one embodiment of the present invention, the user is provided with the ability to perform multiple searches with different dictionaries or search engines, according to the user's needs. The user has the option of marking the words (or sentences) with several different symbols or colors or text highlighting and associating each of these marking to a specific dictionary or search engine. Searches of each of the selected text portions is performed within the associated dictionary databases, and the user is provided with the results of the searches for facilitating comprehension of the text.

19 Claims, 6 Drawing Sheets

SEARCH ENGINES www.google.com        ▢ colour 1 www.yahoo.com         ▢ colour 2 www.wikipedia.com     ▢ colour 3

[ADD]   [EDIT]   [REMOVE]

COMPREHENSION OF DIGITALLY ENCODED TEXTS

PRIORITY

This application is based on and claims the benefit of priority from European Patent Application No. EP08150561.2, filed Jan. 23, 2008.

BACKGROUND

The comprehension of texts is not always an easy task, especially when the texts relate to very specialized fields, such as technical disciplines.

SUMMARY OF THE INVENTION

Due to the easy accessibility of Internet resources, a great amount of information is normally readily available to a user. However to exploit such huge availability of information, the user should be able to access this information in a relatively easy and transparent way. In order to facilitate this task, search engines are available to Internet users which help in searching documents, for example, the user can indicate a list of keywords (including complex sentences) and the search engine returns a list of documents containing such keywords. In some circumstances it might be advisable to search specialized dictionaries which could provide a better selection of definitions, for example, www.online-medical-dictionary.org for medical terms or www.historyonthenet.com/history_dictionary.htm for historical references.

In one embodiment of the invention, user comprehension of digitally encoded texts is facilitated. The method may further include the steps of: providing an user of a data processing system, access to a plurality of dictionary references; responsive to user input, selecting a first set of text portions; responsive to user indication, associating the first set of text portions to a first set of the plurality of dictionary databases; responsive to user input, selecting at least one further set of text portions; responsive to user indication associating the at least one further set of text portions to a corresponding at least one further set of the plurality of dictionary databases; performing a search of each of the selected text portions within the associated dictionary databases; providing the user with the result of the searches for facilitating the text comprehension.

Implementations of the technique discussed above may include a computer-implemented method, a system, or a computer program product. The details of one or more embodiments of the invention are set forth in the accompanying drawings and the description below. Other features of the invention will be apparent from the description and drawings, and from the claims.

DETAILED DESCRIPTION

Figure 1:
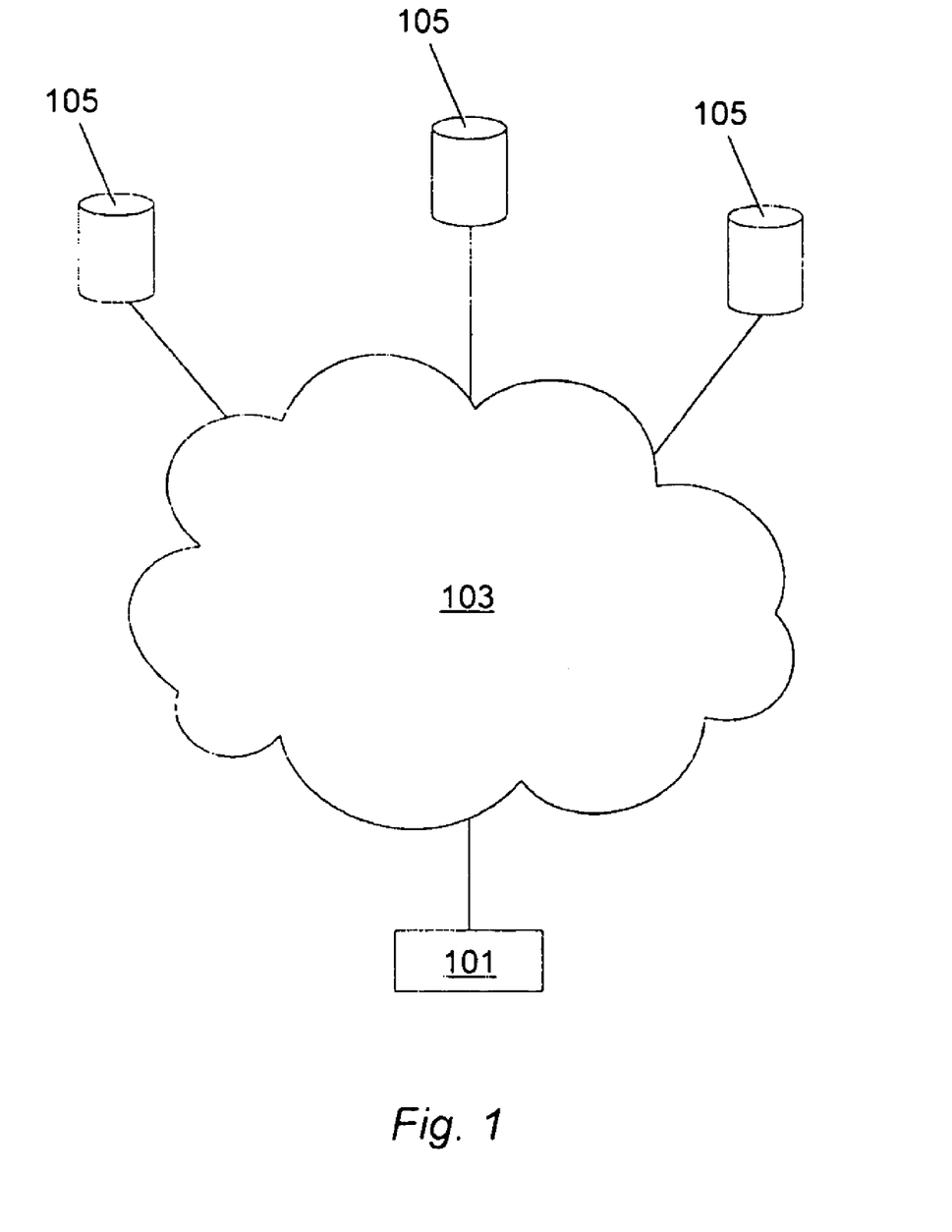
FIG. 1 is a schematic representation of the system according to an embodiment of the invention.

With reference in particular to FIG. 1, a system embodying the present invention is schematically represented. A computer 101 displays a digitally encoded representation of a text to a user by means of a browser or any other suitable means, for example, using a text editor. The text can be locally stored on the computer 101 or, alternatively it can be remotely available through a WAN or an Internet connection. In another embodiment of the present invention, the computer 101 is connected to a network 103 through which a plurality of databases 105 can be navigated. Databases 105 can be dictionaries which are, for example, accessed by means of search engine software. According to another embodiment of the present invention, the databases 105 may contain specialized dictionaries which may be selected by the user according to his needs. As an example, if the user is reading a document in a foreign language, he might be interested in consulting a language dictionary or a translator, such as www.freediet.com/onldiet or www.freetranslation.com, for help in understanding the text.

Figure 2:
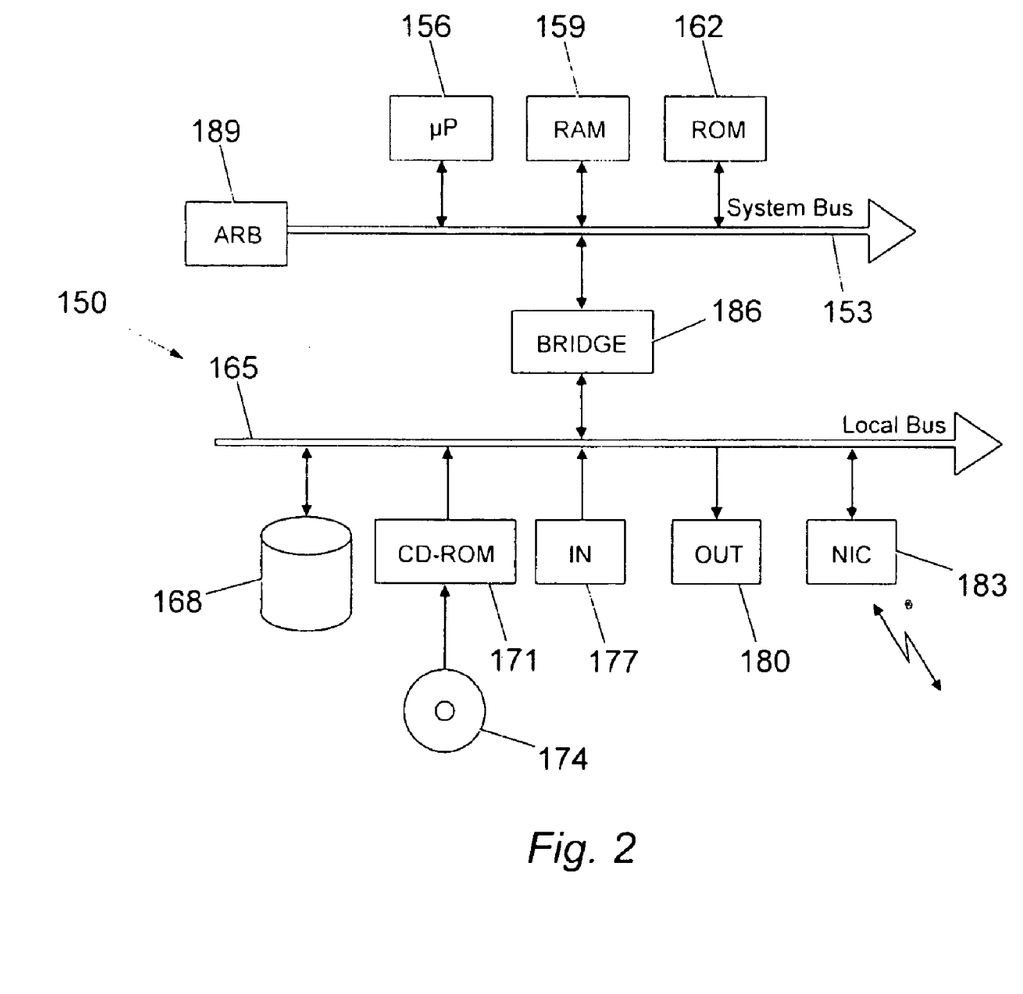
FIG. 2 shows the functional blocks of a particular computer of the system according to another embodiment of the present invention.

As shown in FIG. 2, a computer of the system (for example, a PC, Internet server, router) 150 is formed by several units that are connected in parallel to a system bus 153. One or more microprocessors 156 control operation of the computer 150; a RAM 159 is directly used as a working memory by the microprocessors 156, and a ROM 162 stores basic code for a bootstrap of the computer 150. Peripheral units are clustered around a local bus 165 by means of respective interfaces. A mass memory comprises a hard-disk 168 and a drive 171 for reading CD-ROMs 174. Moreover, the computer 150 may include input devices 177, for example, a keyboard and a mouse, and output devices 180, for example, a monitor and a printer. A Network Interface Card 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153. Similar considerations apply if the system has a different topology, or it is based on other networks. Alternatively, the computers have a different structure, include equivalent units, or consist of other data processing entities such as PDAs, mobile phones, and the like.

Figure 3:
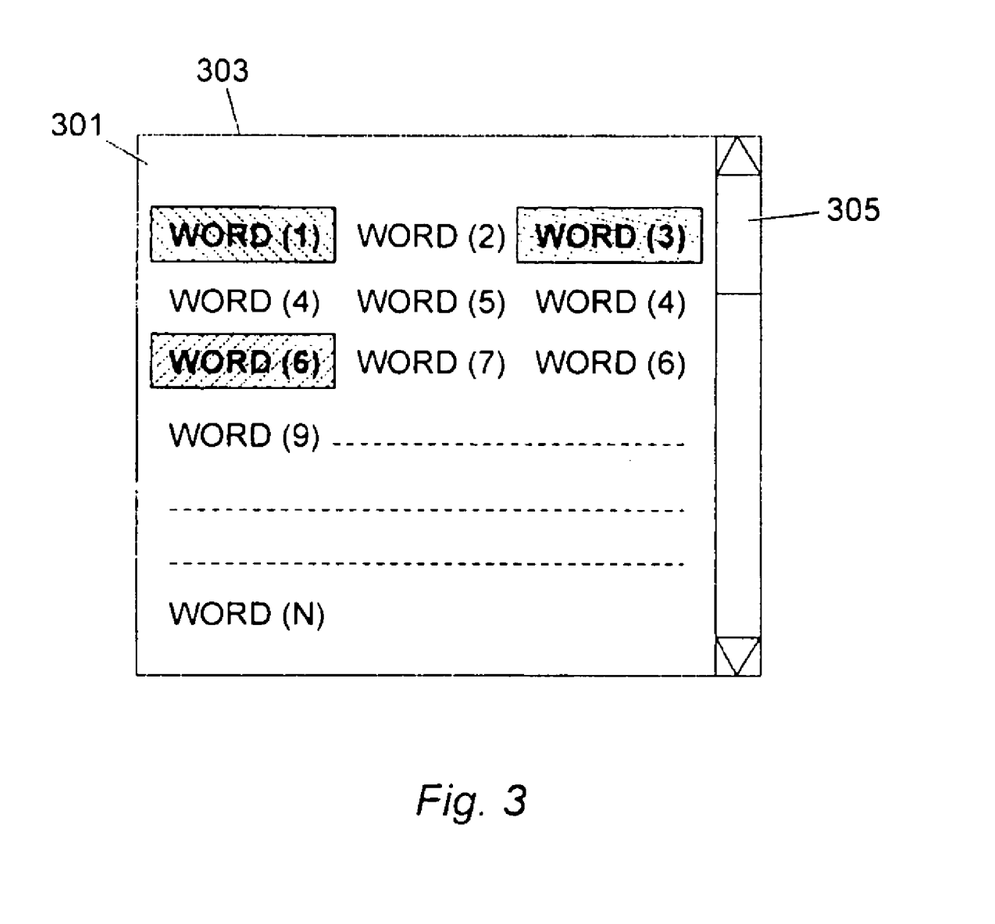
FIGS. 3 and 4 show examples of possible implementations of the present invention.

As shown in FIG. 3, according to another embodiment of the present invention, a computer is used to read a document 301 on a screen 303. The document 301 consists of a collection of information arranged in a specific layout; the document 301 may include information in different formats such as text, drawings, pictures, graphs, and the like. Typically, only a portion of the whole document 301, that is, a page or a portion of a page is displayed on the screen 303 according to its size. A scroll-bar 305 is used to slide the document 301, such as vertically, for its complete reading.

Referring to the text of the document 301, it consists of a sequence of sentences each one formed by a group of words. Each word "word(i)" represents a meaningful unit, such as a noun, an adjective, a verb, an adverb, and the like, of a specific language such as English.

According to an embodiment of the invention, the user can perform multiple searches with different dictionaries or search engines, according to his/her needs. As an example, if the user does not know the meaning of some words in a foreign language they may need access to a language dictionary, and at the same time if the user would like more information about a certain query or name or geographical place they would need access to a general encyclopaedia or a search engine; another possibility is that for understanding a specific technical term, a specialized dictionary may be required. According to an embodiment of the present invention, the user has the option of marking the words or sentences with several different symbols or colors or text highlighting and associating each of these marking to a specific dictionary or search engine. In the example shown in FIG. 3. WORD(1). WORD(3) and WORD(6) have been marked with different colors (represented on the black & white drawing with different backgrounds) wherein each color is associated with a different dictionary or search engine (see also FIG. 4). In this way, the user can select the more appropriate search environment according to specific needs. Information related to selected words, for example, their translation in another language, such as Italian, or detailed description found on a dictionary, can then be displayed on a section of the screen or in a pop-up window. Those skilled in the art will appreciate that many different methods and techniques for displaying the results of the search to the user are available in commercial software and systems. In another embodiment, a pop-up window is used but any other displaying arrangement may be used instead according to the system administrator's or the user's choice.

Figure 4:
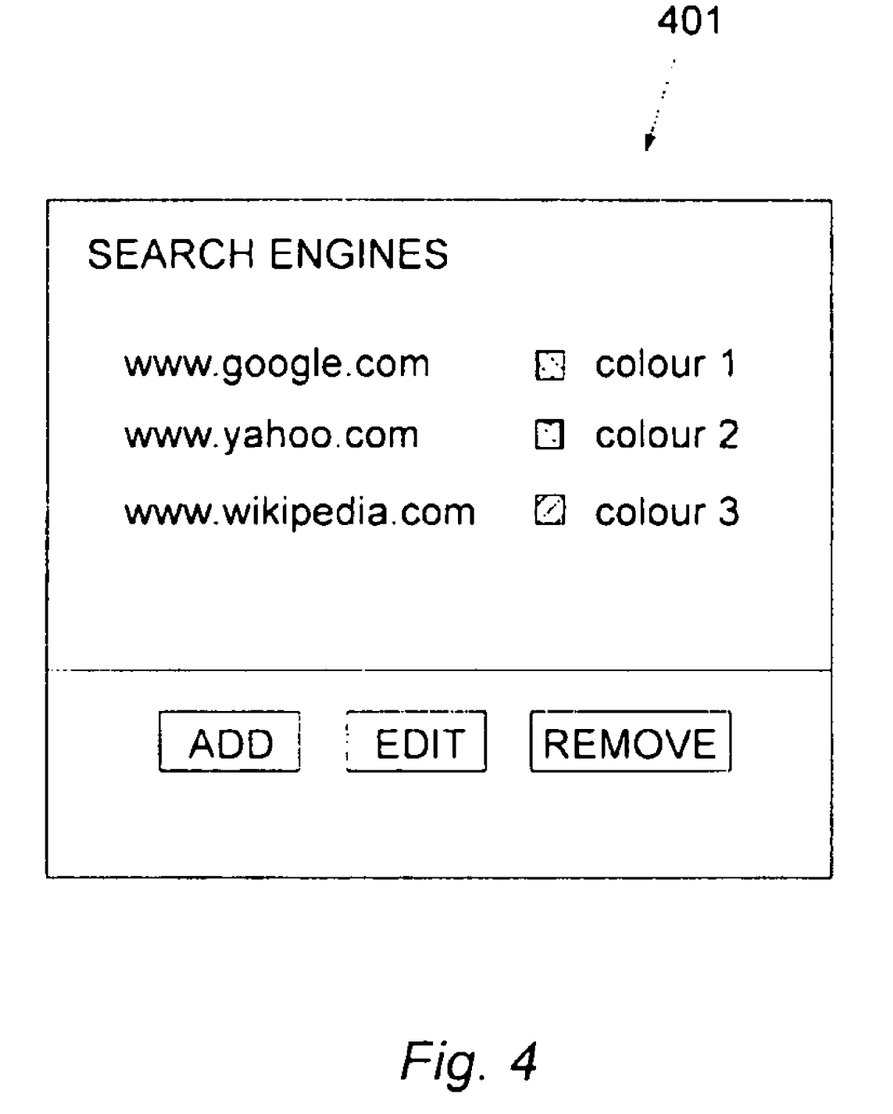

FIG. 4 shows an example of configuration options available to the user; a number of search engines are included in the list of possible search engines on which the search can be performed according to user selection as shown on the box 401; each search engine is associated to a color which will be used by the user to mark the selection of the desired words. The search will then be performed on the selected engine. Another possible option (not shown) would be to combine more than one color or even to create a "rainbow" option according to which several or all the available search engines will be used for the search of a selected word. The user can also modify the existing list of search engine, by means of buttons represented on the screen, for example, in this embodiment, "add" "edit" and "remove". Those skilled in the art will appreciate that several other ways of marking the words for associating to a specific search engine could be used instead, just to make an example, the use or underlined, bold, roman characters could replace the different colors.

Figure 5:
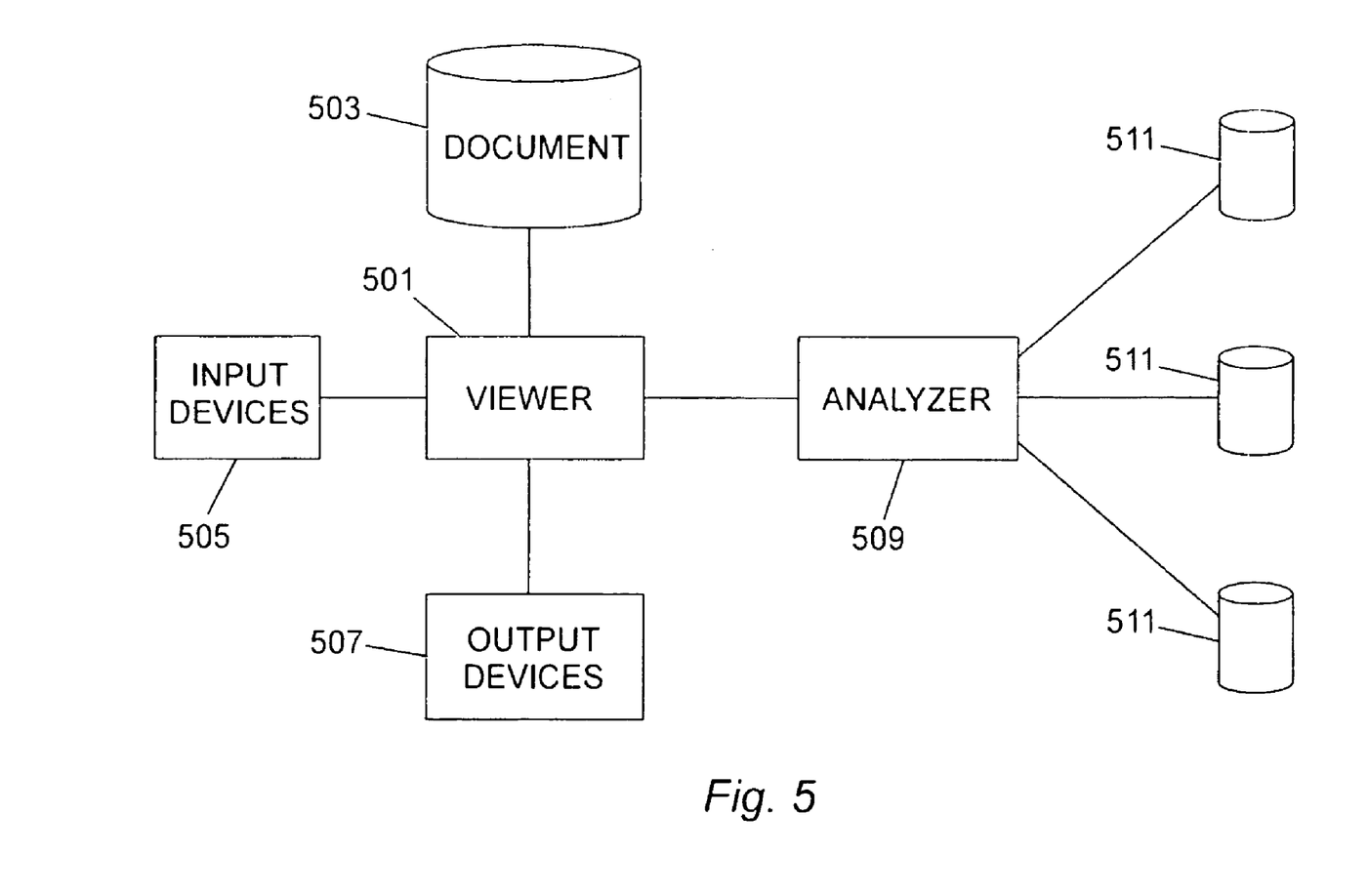
FIG. 5 shows a system suitable for implementing the present invention.

FIG. 5 shows the main software modules that run on the above-described computer. In one embodiment, the computer program product is stored on the hard-disk and loaded (at least partially) into the working memory of the computer when the programs are running. The programs are initially installed onto the hard disk, for example, from CD-ROM. In one embodiment, the computer runs a viewer 501 comprising a word processor, a reader, a browser and the like. The viewer 501 is used to read documents 503, such as letters, articles, e-books, presentations, and the like. The user or reader interacts with the viewer 501 through input devices 505. e.g. a mouse and a keyboard; on the other hand, the viewer 501 controls output devices, such as the monitor of the computer 507.

The viewer 501 is provided with an analyzer module 509, which implements the above-described solution. For this purpose, the analyzer 509 accesses a set of dictionaries or databases 511. These dictionaries and databases 511 can be locally stored on the computer or accessible remotely, for instance, from the World Wide Web as described above. The user can select a number of words on document 503 by means of the input devices 505 as explained above. The system will then perform the search according to the user preferences on the associated dictionary and databases by means of search engines.

In another embodiment of the present invention, a further possible implementation may include the automation of the search by means of a set of dictionaries containing specialized information regarding different technical areas. The system is configured to determine which dictionaries are most likely to be relevant to the search request. When the user highlights a word or group of words, the system identifies the specific vocabulary and automatically prompts the user with the preconfigured associated search engine. In this way, the system purposely limits the scope of the provided search and retrieval services, and provides a more efficient and effective search result. The implementation of such alternatives may include the following features:

1. Multiple dictionaries, on subjects such as history, science, languages, geography, philosophy, may be loaded onto the system which extracts words and includes them into the corresponding categories wherein each category may be a separate file.

2. The browser by default provides a list of search engines associated to the most common content categories just as it provides a list of useful links, by default. For example, it may have default web addresses for history, science, languages, geography or philosophy. The list of web sites may be contained in a file.

3. When a user reads text and hovers over a word or group of words the system automatically displays a pop-up box suggesting a possible web site to be used to search for the word. To provide the suggestion, the system recognizes the word that is contained in one of the stored categories and associates it to the one or more search engines corresponding to that category.

4. The system may optionally comprise a self-updating mechanism that enriches the lists of default web sites proposed by the browser including all the search engines used or visited by the user and organizing them in existing or new categories. The web site and word categories can be constantly updated and mapped.

Figure 6:
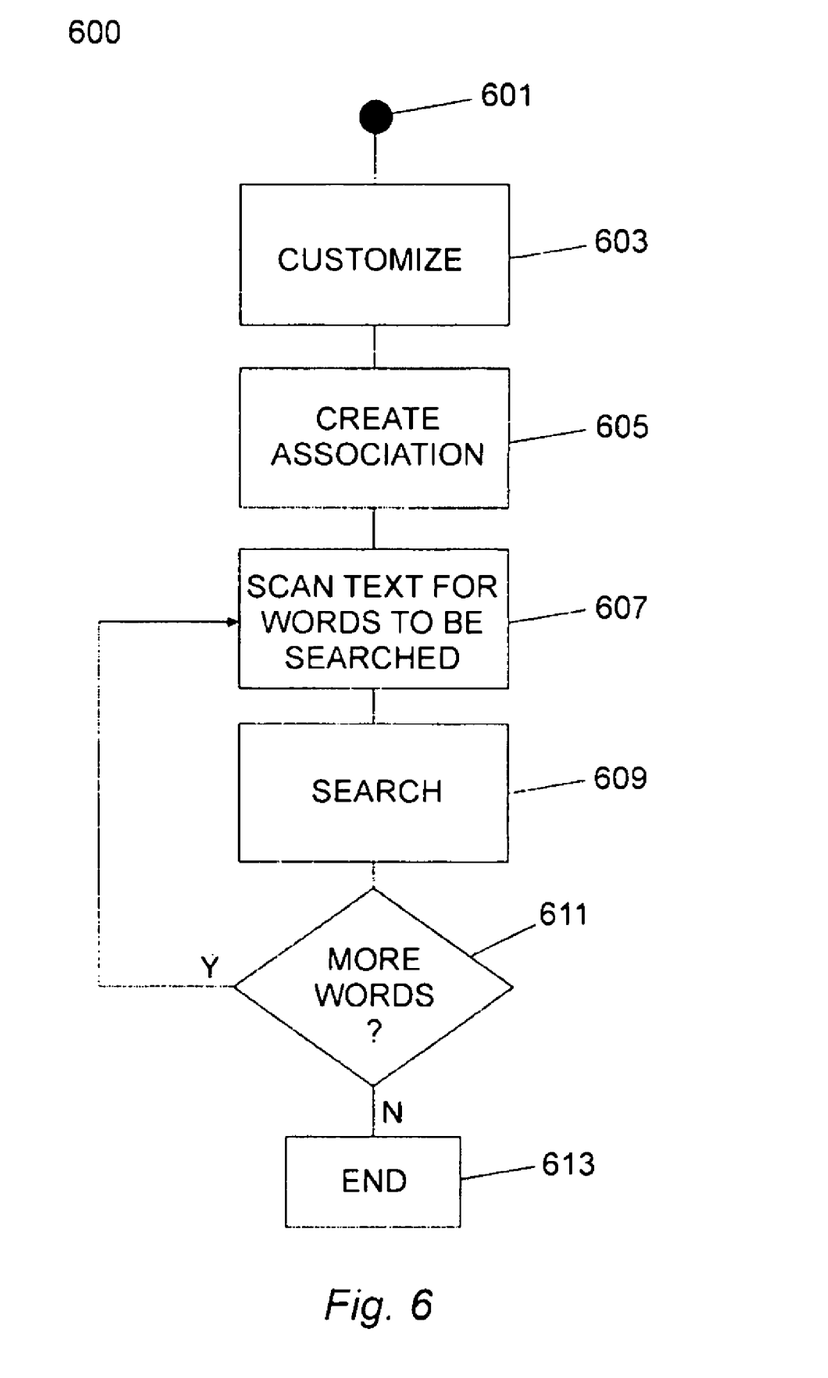
FIG. 6 is a diagram representing the method steps according to an embodiment of the present invention.

With reference to FIG. 6, the logic flow of the method according to another embodiment of the present invention is illustrated with a diagram. The method begins at the black start circle 601. Continuing to block 603 the user can create and customise the list of dictionaries and search engines to be used for the searches; a different color, or another way of marking, may be associated with each dictionary or search engine (step 605), when a user wishes a particular word or sentence being searched he will indicate which dictionary or search engine shall be used. As explained above, this intention can be expressed by marking the desired words with the corresponding marking (for example, a color highlighting) associated to the selected search engine. The system then scans the text to detect any occurrence of user's selection (step 607) and performs the search accordingly (step 609). Steps 607 and 609 are repeated until the user selected words are finished (step 611), in which case the process ends (613). As mentioned above, more than one color (and corresponding dictionary) can be associated with a search.

A person skilled in the art may apply to the solution described above many modifications and alterations. Particularly, although the present invention has been described with a certain degree of particularity with reference to certain embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has a different structure or includes equivalent units, such as cache memories temporarily storing the programs or parts thereof to reduce the accesses to the mass memory during execution; in any case, it is possible to replace the computer with any code execution entity such as a PDA, a mobile phone, and the like.

Moreover, it is expressly intended that the term word as used herein must not be interpreted in its strict sense; indeed, the translation may also be applied to idioms, phrases, or more generally to any other text portions. The translation or description associated with each searched word may consist of a list of words or expressions explaining the possible meanings of the word.

In another embodiment of the invention, the results of the searches are displayed in a dedicated box close to the original text; more generally, it is possible to output the text and/or the translations in any other way such as, in a printed form, with a text-to-speech system, and the like. The selection of additional words and/or translations is merely illustrative and must not to be interpreted in a limitative manner; for example, it is possible to provide dedicated commands for selecting further words and/or for deselecting certain words.

Alternatively, it is possible to replace the dictionary with any equivalent structure; for example, the requested information may be provided at runtime by a dedicated service. In any case, although in the preceding description reference has been made to the translation of documents written in a foreign language, the proposed solution is more generally applicable to facilitate the comprehension of whatever text. For example, the same concepts find application to explain the meaning of the most difficult specialized terms or acronyms of a document.

Similar considerations apply if the computer program product is structured in a different way, or if additional modules or functions are provided; likewise, the memory structures may be of other types, or may be replaced with equivalent entities. Moreover, the proposed solution lends itself to be implemented with an equivalent method having similar or additional steps, even in a different order. In any case, the program may take any form suitable to be used by or in connection with any data processing system, such as external or resident software, firmware, or microcode either in object code or in source code. Moreover, the program may be provided on any non-transitory or transitory computer-usable medium; the non-transitory medium can be any element suitable to contain, store, or communicate the program and the transitory medium can be any element suitable to propagate or transfer the program. Examples of such non-transitory media are fixed disks where the program can be pre-loaded, removable disks, tapes, and cards. Examples of such transitory media include wires, fibers, wireless connections, networks, broadcast waves, and the like. For example, the computer-usable medium may be of the electronic, magnetic, optical, electromagnetic, infrared, or semiconductor type.

The described systems, methods, and techniques may be implemented in digital electronic circuitry, computer hardware, firmware, software, or in combinations of these elements. Systems embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer program products that are executable on a programmable system including at least one programmable processor coupled to receive data and instructions from, and to transmit data and instructions to a data storage system, at least one input device, and at least one output device. Each computer program product may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM). Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs.

It will be understood that various modifications may be made without departing from the spirit and scope of the claims. For example, useful results may be achieved if steps of the disclosed techniques were performed in a different order and/or if components in the disclosed systems were combined in a different manner and/or replaced or supplemented by other components. Accordingly, other implementations are within the scope of the following claims.

The invention claimed is:

1. A method of facilitating computer-assisted comprehension of digitally encoded texts comprising:
providing a user of a data processing system access to a plurality of dictionary databases;
associating at least one content category with each dictionary database;
responsive to an indication by the user, associating at least one predetermined marking with each of the plurality of dictionary databases;
identifying at least one text portion marked by the user with a first marking;
identifying at least one additional text portion marked by the user with a second marking, the second marking being different from the first marking, the at least one text portion and the at least one additional text portion being part of a same digitally encoded text;
identifying one or more dictionary databases associated with the first marking;
determining a subset of dictionary database(s) from the one or more dictionary databases identified as being associated with the first marking, each dictionary database in the subset having a content category that corresponds to the at least one text portion;
identifying one or more dictionary databases associated with the second marking;
initiating a searching process comprising performing a first search of the at least one text portion within the subset of dictionary database(s) and performing a second search of the at least one additional text portion within the one or more dictionary databases associated with the second marking; and providing the results of the first and second searches to the user in a consolidated format.

2. The method of claim 1 wherein at least one of the plurality of dictionary databases is accessed through a network.

3. The method of claim 2 wherein the network is the World Wide Web.

4. The method of claim 3 wherein at least one of the plurality of dictionary databases is an online dictionary.

5. The method of claim 1 wherein at least one of the plurality of dictionary databases is accessed using a search engine.

6. The method of claim 1 wherein the text portions comprise single words.

7. The method of claim 1 wherein the predetermined marking is a color and each of the plurality of dictionary databases is assigned at least one color.

8. The method of claim 1 wherein the first search and the second search are performed substantially concurrently.

9. The method of claim 1 further comprising providing a user with a capability to modify at least one of a number and a type of dictionary databases in the plurality of dictionary databases.

10. A computer program product for facilitating user comprehension of digitally encoded texts, the computer program product comprising:
a non-transitory computer-usable medium including:
computer program instructions for accessing a plurality of dictionary databases;
computer program instructions for associating at least one content category with each dictionary database;
computer program instructions for associating at least one predetermined marking with each of the plurality of dictionary databases;
computer program instructions for identifying at least one text portion marked by the user with a first marking;
computer program instructions for identifying at least one additional text portion marked by the user with a second marking, the second marking being different from the first marking, the at least one text portion and the at least one additional text portion being part of a same digitally encoded text;
computer program instructions for identifying one or more dictionary databases associated with the first marking;
computer program instructions for determining a subset of dictionary database(s) from the one or more dictionary databases identified as being associated with the first marking, each dictionary database in the subset having a content category that corresponds to the at least one text portion;
computer program instructions for identifying one or more dictionary databases associated with the second marking;
computer program instructions for initiating a searching process comprising performing a first search of the at least one text portion within the subset of dictionary database(s) and performing a second search of the at least one additional text portion with the one or more dictionary databases associated with the second marking;
computer program instructions for displaying the results of the first and second searches to the user in a consolidated format.

11. The computer program product of claim 10 further comprising computer program instructions for accessing at least one of the plurality of dictionary databases through a network.

12. The computer program product of claim 10 further comprising computer program instructions for accessing at least one of the plurality of dictionary databases using a search engine.

13. The computer program product of claim 10 wherein the predetermined marking is a color and the computer program instructions for associating the at least one predetermined marking with each of the plurality of dictionary databases comprises assigning at least one color to each dictionary database.

14. The computer program product of claim 10 further comprising computer program instructions for performing the first search and the second search substantially concurrently.

15. A system for facilitating user comprehension of digitally encoded texts, the system comprising:
a processor; and
a computer memory operatively coupled to the processor;
wherein the computer memory has disposed within it:
computer program instructions for providing a user of the system with access to a plurality of databases;
computer program instructions for associating at least one content category with each dictionary database;
computer program instructions for associating at least one predetermined marking with each of the plurality of dictionary databases;
computer program instructions for identifying at least one text portion marked by the user with a first marking;
computer program instructions for determining a subset of dictionary database(s) from the one or more dictionary databases identified as being associated with the first marking, each dictionary database in the subset having a content category that corresponds to the at least one text portion;
computer program instructions for identifying at least one additional text portion marked by the user with a second marking, the second marking being different from the first marking, the at least one text portion and the at least one additional text portion being part of a same digitally encoded text;
computer program instructions for identifying one or more dictionary databases associated with the first marking;
computer program instructions for identifying one or more dictionary databases associated with the second marking;
computer program instructions for initiating a searching process comprising performing a first search of the at least one text portion within the subset of dictionary database(s) and performing a second search of the at least one additional text portion within the one or more dictionary databases associated with the second marking; and
computer program instructions for displaying the results of the first and second searches to the user in a consolidated format.

16. The system of claim 15 further comprising computer program instructions for accessing at least one of the plurality of dictionary databases through a network.

17. The system of claim 15 further comprising computer program instructions for accessing at least one of the plurality of dictionary databases using a search engine.

18. The system of claim 15 wherein the predetermined marking is a color and the computer program instructions for associating the at least one predetermined marking with each of the plurality of dictionary databases comprises assigning at least one color to each dictionary database.

19. The system of claim 15 further comprising computer program instructions for performing the first search and the second search substantially concurrently.

\* \* \* \* \*